United States Patent
Hasuko

(10) Patent No.: US 11,232,325 B2
(45) Date of Patent: Jan. 25, 2022

(54) DATA ANALYSIS SYSTEM, METHOD FOR CONTROLLING DATA ANALYSIS SYSTEM, AND RECORDING MEDIUM

(71) Applicant: FRONTEO, Inc., Tokyo (JP)

(72) Inventor: Kazumi Hasuko, Tokyo (JP)

(73) Assignee: FRONTEO, INC., Tokyo (JP)

( * ) Notice: Subject to any disclaimer, the term of this patent is extended or adjusted under 35 U.S.C. 154(b) by 588 days.

(21) Appl. No.: 15/787,157

(22) Filed: Oct. 18, 2017

(65) Prior Publication Data

US 2018/0114093 A1  Apr. 26, 2018

(30) Foreign Application Priority Data

Oct. 20, 2016 (JP) .............................. JP2016-206390

(51) Int. Cl.
| | |
|---|---|
| *G06K 9/62* | (2006.01) |
| *G06Q 30/02* | (2012.01) |
| *G06F 17/18* | (2006.01) |
| *G06N 20/00* | (2019.01) |
| *G06K 9/00* | (2006.01) |
| *G06N 3/08* | (2006.01) |

(52) U.S. Cl.
CPC ........... *G06K 9/6221* (2013.01); *G06F 17/18* (2013.01); *G06K 9/6255* (2013.01); *G06Q 30/0201* (2013.01); *G06K 9/00879* (2013.01); *G06N 3/08* (2013.01); *G06N 20/00* (2019.01)

(58) Field of Classification Search
CPC ...... G06F 16/907; G06F 16/908; G06F 16/95; G06F 17/18; G06Q 30/0201; G06K 9/6221
See application file for complete search history.

(56) References Cited

U.S. PATENT DOCUMENTS

| | | | | |
|---|---|---|---|---|
| 5,854,923 | A * | 12/1998 | Dockter | G06Q 30/0201 707/694 |
| 8,560,398 | B1 * | 10/2013 | Gregov | G06Q 30/06 705/26.2 |
| 9,710,456 | B1 * | 7/2017 | Mengle | G06F 40/30 |
| 10,453,099 | B2 * | 10/2019 | Korpusik | G06Q 30/0269 |
| 2006/0106670 | A1 * | 5/2006 | Cai | G06Q 30/02 705/13 |

(Continued)

FOREIGN PATENT DOCUMENTS

JP  2010-272015  12/2010

*Primary Examiner* — Kris E Mackes

(74) *Attorney, Agent, or Firm* — Brundidge & Stanger, P.C.

(57) ABSTRACT

Provided is a data analysis system that generates effective information affecting a user's tendency to buy a product and service. The data analysis system analyzes data to generate information on a tendency of a user, and includes: a memory that stores at least temporarily a plurality of evaluation data to be analyzed; and a controller that evaluates each of the plurality of evaluation data based on training data, wherein the controller extracts first information from the plurality of evaluation data based on results of the evaluation of the plurality of evaluation data, extracts second information from the training data based on a characteristic pattern included in the first information, and generates the information on the tendency of the user from the first information and the second information.

12 Claims, 5 Drawing Sheets

(56) References Cited

U.S. PATENT DOCUMENTS

| | | | |
|---|---|---|---|
| 2011/0295612 A1* | 12/2011 | Donneau-Golencer | ........................ G06Q 30/02 705/1.1 |
| 2013/0066873 A1* | 3/2013 | Salvetti | .............. G06Q 30/0278 707/738 |
| 2013/0191213 A1* | 7/2013 | Beck | .................. G06Q 30/0267 705/14.53 |
| 2015/0066586 A1* | 3/2015 | Teraoka | ............. G06Q 30/0201 705/7.29 |
| 2016/0086230 A1* | 3/2016 | French | ............... G06Q 30/0269 705/14.44 |

* cited by examiner

FIG.6

『WINE A』

I RECOMMEND THIS BECAUSE "IT'S FREE FROM ANTIOXIDANTS AND I WOULD NEVER BUY ANYTHING ELSE". IN PARTICULAR "BECAUSE IT DOES NOT CONTAIN ANY ANTIOXIDANTS, I THINK THIS IS GOOD FOR HEALTH AND I FEEL GOOD ABOUT DRINKING IT".

600

DATA ANALYSIS SYSTEM, METHOD FOR CONTROLLING DATA ANALYSIS SYSTEM, AND RECORDING MEDIUM

BACKGROUND OF THE INVENTION

1. Field of the Invention

The present invention relates to a data analysis system and is applicable to, for example, a system including artificial intelligence that analyzes big data.

2. Description of the Related Art

As the computerization of society grows with the development of computers, it has become important to analyze data and use the analysis results in the business activities of companies and persons. For example, on web sites where products are traded through the Internet, data analyses on the consumption behavior of consumers are performed, and results of the analyses are used to accelerate the consumption behavior of the consumers. Japanese Patent Application Laid-open No. 2010-272015 discloses a system in which an Internet shopping management apparatus not only returns, to a user, a search result in response to a search request but also presents, to the user, product purchase history of the user in order to promote new consumption of the user.

SUMMARY OF THE INVENTION

Consumers' motivation for buying products are different between consumers due to differences in individual preferences. Therefore, in a simple mode in which product purchase history is presented as in the system described in Japanese Patent Application Laid-open No. 2010-272015, the consumption activities of consumers may not be actually aroused. First of all, it is not easy to discriminate data capable of substantially arousing consumers' intentions to buy products from high-capacity accumulated data relating to the consumption behavior of consumers. Actually, such a system has not been realized.

In view of the above problems, the present invention has an object of providing, for example, a data analysis system that generates effective information affecting a user's tendency to buy a product and service.

The above object is achieved by extracting first information from a plurality of evaluation data based on results of the evaluation of the plurality of evaluation data, extracting second information from training data based on a characteristic pattern included in the first information, and generating information on the tendency of a user from the first information and the second information.

By the above disclosure, for example, a data analysis system that generates effective information affecting a user's tendency to buy a product and service is provided.

BRIEF DESCRIPTION OF THE DRAWINGS

The above and other objects and features of the present invention will become apparent from the descriptions of the following embodiments with reference to the accompanying drawings in which;

FIG. 6 is a diagram showing an output example of the reason data.

DESCRIPTION OF THE PREFERRED EMBODIMENTS

Configuration of Data Analysis System

Figure 1:
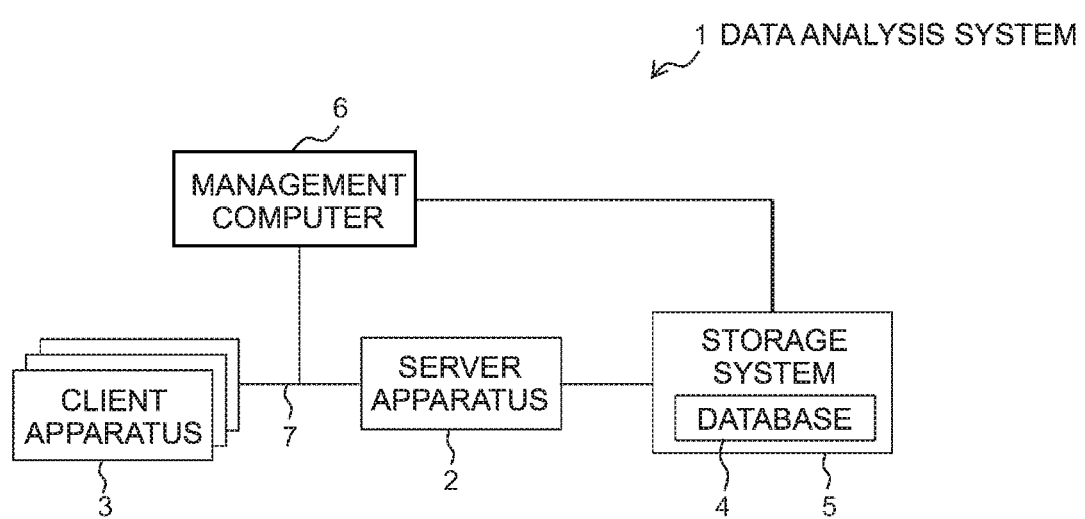
FIG. 1 is a block diagram showing an example of the hardware configuration of a data analysis system.

FIG. 1 is a block diagram showing an example of the hardware configuration of a data analysis system 1 (hereinafter simply abbreviated as a "system" where necessary) according to a present embodiment. The system includes, for example, any recording medium (for example, a memory or a hard disk) capable of storing data (including digital data and/or analog data) and a controller (a central processing unit; CPU) capable of performing a control program stored in the recording medium and may be realized as a computer or a computer system that analyzes data stored at least temporarily in the recording medium (a system in which a plurality of computers integrally operates to realize a data analysis).

In the embodiment, "training data" may be, for example, data (classified reference data or the combination of reference data and classifying information) that is presented to a user as the reference data and in which the classifying information is made to correspond to each other. The training data may also be called "teacher data." Further, "evaluation data" may be data (unclassified data not presented to the user as the reference data and not classified for the user or "unknown data") in which the classifying information is not made to correspond to each other. Here, the "classifying information" may be an identification label used to arbitrarily classify the reference data and may be, for example, information for classifying the reference data into any number of (for example, two) groups like a "Related" label indicating that the reference data and a prescribed matter (the system widely includes targets of which the relevance to data is evaluated and its target range is not limited) relate to each other and a "Non-Related" label indicating that the reference data and the prescribed matter do not relate to each other.

As exemplified in FIG. 1, the system may include, for example, a server apparatus (server computer) 2 capable of performing the main processing of a data analysis, one or a plurality of client apparatuses (client computers) 3 capable of performing the relevance processing of the data analysis, a storage system 5 having a database 4 on which data and results of the evaluation of the data are recorded, and a management computer 6 that provides the client apparatuses 3 and the server apparatus 2 with a management function to perform the data analysis. Each of the apparatuses may include (but not limited to), for example, a memory, a controller, a bus, an input/output interface (for example, a keyboard, a display, or a speaker), or a communication interface (that communicably connects the respective apparatuses to each other via communication means using a prescribed network) as a hardware resource. The server apparatus 2 includes a (non-transitory) storage medium on which a program or data necessary for the data analysis is recorded, for example, a hard disk, a flash memory, a DVD, a CD, or a BD.

The client apparatuses 3 present a part of data to the user as reference data. Thus, the user may perform an input operation (give classifying information) to evaluate and classify the reference data via the client apparatuses 3 as an evaluator (or a reviewer). The server apparatus 2 learns, based on the combination (training data) of the reference data and the classifying information, a pattern (widely specifies, for example, an abstract rule, meaning, concept, format, distribution, sample, or the like included in the data and is not limited to a so-called "specific pattern") from the data and evaluates the relevance between evaluation data and a prescribed matter based on the learned pattern.

The management computer 6 performs prescribed management processing on the client apparatuses 3, the server apparatus 2, and the storage system 5. The storage system 5 is constituted by, for example, a disk array system and may include the database 4 on which data and results of the evaluation and classification of the data are recorded. The server apparatus 2 and the storage system 5 are communicably connected to each other via a direct attached storage (DAS) method or a storage area network (SAN).

Note that the hardware configuration shown in FIG. 1 is given only for exemplification and the system may be substituted by another hardware configuration. For example, a part or all of processing performed by the server apparatus 2 may be performed by the client apparatuses 3 or the server apparatus 2, and the storage system 5 may be incorporated in the server apparatus 2. Further, the user may perform an input operation (give classifying information) to evaluate and classify sample data not only via the client apparatuses 3 but also via an input device directly connected to the server apparatus 2. A person skilled in the art could understand the existence of a variety of hardware configurations capable of realizing the system, and the system is not limited to one specific configuration (for example, the configuration exemplified in FIG. 1).

Data Evaluation Function

The system may include a data evaluation function. The data evaluation function is used to evaluate a multiplicity of evaluation data (big data) based on a small number of manually classified data (training data). With the data evaluation function, the system may derive an index (for example, a numerical value (for example, a score), a character (for example, "high," "middle," or "low,"), and/or a symbol (for example, "⊗", "O," "Δ," or "×,") by which it becomes possible to grade the evaluation data) indicating the degree of the relevance between the evaluation data and a prescribed matter to realize the above evaluation. The data evaluation function is realized by the controller of the server apparatus 2.

When deriving a score as an index for the evaluation, the system may calculate the score according to any method. For example, the system may calculate the score based on machine learning or various methods used in the field of natural language processing (for example, a k-nearest neighbor method, a method using a support vector machine, a method using a neural network, a method in which a statistical model for data is hypothesized (for example, a method using a Gaussian process), and/or a method in which these methods are combined together, or the like), or may calculate the same based on various methods used in the field of statistics (based on, for example, the frequency of the occurrence of constituent elements in data).

The "constituent elements" (also called data elements) may be partial data constituting at least a part of the data such as, for example, morphemes, keywords, sentences, paragraphs, and/or metadata (for example, header information of an electronic mail) constituting a document, partial audio, volume (gain) information, and/or tone information constituting audio, partial images, partial pixels, and/or brightness information constituting an image, or frame images, motion information, and/or three-dimensional information constituting video.

When the system calculates the score based on the frequency of the occurrence of the constituent elements in the data, the following calculation method is, for example, taken into consideration. First, the system extracts the constituent elements constituting the training data from the training data and evaluates the constituent elements. At this time, the system evaluates the degree to which each of the plurality of constituent elements constituting at least a part of the training data contributes to the combination of data and classifying information (in other words, the frequency of the occurrence of the constituent elements according to the classifying information). The degree may also be called a weight. As a more specific example, the system evaluates the constituent elements using a transmitted information amount (for example, an information amount calculated according to a prescribed formula using the occurrence probability of the constituent elements and the occurrence probability of the classifying information) to calculate evaluation values as evaluation information on the constituent elements according to the following formula 1.

$$wgt_{i,L} = \sqrt{wgt_{L-i}^2 + \gamma_L wgt_{i,L}^2 - \theta} = \sqrt{wgt_{i,L}^2 + \Sigma_{i,1}^L (\gamma_L wgt_{i,L}^2 - \theta)} \quad \text{(Math. 1)}$$

Here, wgt indicates an initial evaluation value of the i-th constituent element before evaluation. Further, wgt indicates an evaluation value of the i-th constituent element after the L-th evaluation γ indicates an evaluation parameter in the L-th evaluation, and θ indicates a threshold in the evaluation. Thus, when a value of a calculated transmission information amount is larger, the system may evaluate a constituent element as one expressing the characteristic of prescribed classifying information.

Next, the system makes the constituent elements and the evaluation values correspond to each other and stores both the constituent elements and the evaluation values in any memory (for example, the storage system 5). Then, the system extracts constituent elements from evaluation data and determines whether the constituent elements have been stored in the memory. When the constituent elements have been stored in the memory, the system reads evaluation values made to correspond to the constituent elements from the memory and evaluates the evaluation data based on the evaluation values. As a more specific example, the system may calculate the following formula using the evaluation values made to correspond to the constituent elements constituting at least a part of the evaluation data to calculate the above score.

$$Scr = \Sigma_{i=0}^{N_i} * (m_j * wgt_i^2) / \Sigma_{i=0}^{N_i} * wgt_i^2 \quad \text{(Math. 2)}$$

$m_j$: frequency of occurrence of i-th constituent element
wgt: evaluation value of i-th constituent element The server apparatus 2 may continuously perform (repeatedly performs) the extraction and evaluation of the constituent elements until a reproduction ratio reaches a prescribed target value. The reproduction ratio is an index indicating the ratio (covering ratio) of data to be extracted to a prescribed number of data. When the reproduction ratio is, for example, 80% relative to 30% of all data, 80% of data to be extracted is included in the top 30% of the data on an index (score) as one relating to a prescribed matter. When the data analysis system is not used but a person handles data in a round robin fashion (linear review, an amount of the data to be extracted is proportional to a reviewing amount of the person. Therefore, the larger a difference with the proportion, the better the data analysis performance of the system becomes.

The above example of realizing the data evaluation function is given only for exemplification. That is, the specific mode of the data evaluation function is not limited to one specific configuration (for example, the above method for calculating a score) so long as the data evaluation function is a function by which "evaluation data is evaluated based on training data."

Evaluation of Evaluation Data by Server Apparatus 2

Figure 2:
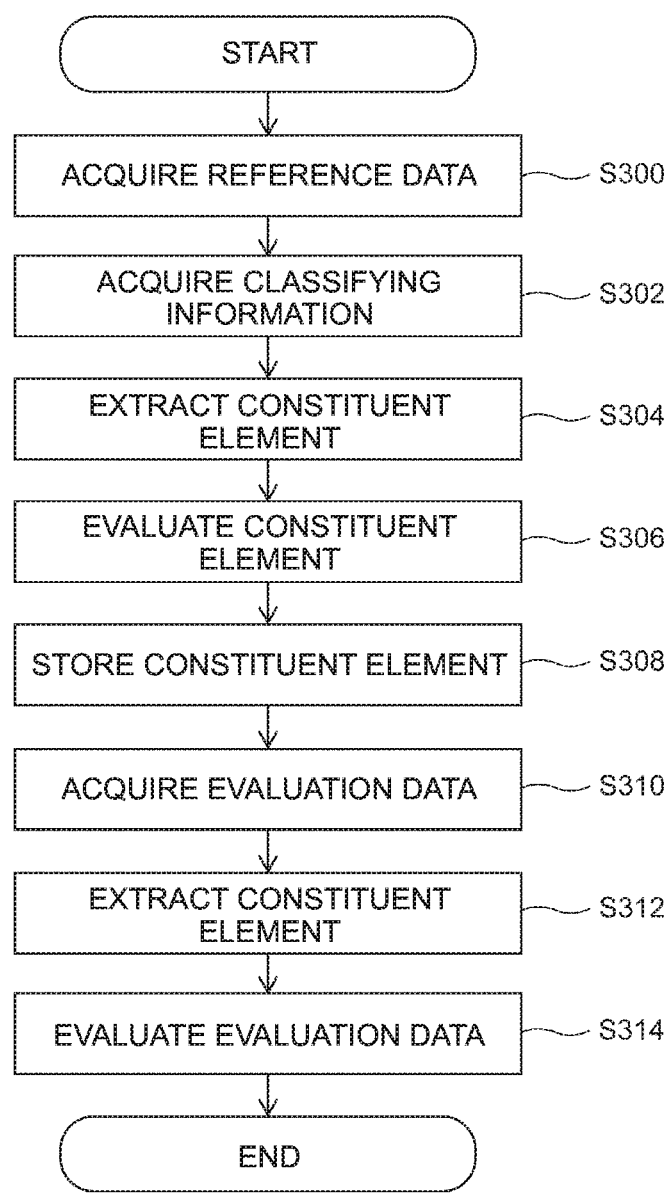
FIG. 2 is a diagram showing an example of a flowchart performed by a server apparatus to evaluate evaluation data.

The operation of evaluating evaluation data by the server apparatus 2 will be described. FIG. 2 is a flowchart of the server apparatus 2 (specifically, the controller of the server apparatus 2). Note that the following respective steps may also be called modules or means.

The server apparatus 2 acquires one or a plurality of data from evaluation data recorded at least temporarily on the storage system 5 as reference data (step S300: reference data acquisition module). For example, the server apparatus 2 searches for a product matching a keyword (for example, "red wine and health") input via the client apparatuses 3 on the Internet (or inside the system), acquires information on the product (recommended product: for example "wine A") and a plurality of review comments on the recommended product, and stores the acquired information and comments in the storage system 5. Further, the server apparatus 2 acquires one or a plurality of review comments matching the keyword from the stored plurality of review comments as the reference data.

Here, the searched target is not limited to a product but may be service, a person, an answer, a cure, or the like. Further, the evaluation data is not limited to a review comment on a product but may be a content relating to the searched target, for example, a service content, personnel evaluation, a complaint content, a doctor's finding (medical record), or a book content. In addition, other data groups such as information for tagging through a question (for example, a question such as "Have you ever drunk?" and "Is there any wine you like?" is given while ten bottles of "wine" is presented to the user as a product) may widely be employed as the reference data.

Next, the server apparatus 2 acquires classifying information, which is input to the reference data by the user after the user determines classification by actually reviewing the reference data, from any input apparatus (step S302: classifying information acquistion module). For example, the server apparatus 2 acquires an action (such as tagging of "helpful" and "I like!," bookmarking, and neglection) for the review comment via the client apparatuses 3. Further, for example, the server apparatus 2 may receive an answer to the above questions or may receive other actions.

The server apparatus 2 combines the reference data and the classifying information together to constitute training data and extracts constituent elements from the training data (step S304: constituent element extraction module). Then, the controller evaluates the constituent elements (step S306: constituent element evaluation module), makes the constituent elements and evaluation values correspond to each other, and stores both the constituent elements and the evaluation values in the storage system 5 (step S308: constituent element storage module).

The processing of the above steps S300 to S308 corresponds to a "learning phase" (a phase in which artificial intelligence learns a pattern). Note that the training data may be prepared in advance instead of being generated from the reference data. For example, in the case of finding a related document for invalidating a patent relating to a patent right, training data may be the combination of the description of claims and a "Related" label.

Next, the server apparatus 2 acquires evaluation data from the storage system 5 (step S310: evaluation data acquisition module). Moreover, the server apparatus 2 reads constituent elements and their evaluation values from the storage system 5 and extracts the constituent elements from the evaluation data (step S312: constituent element extraction module). The server apparatus 2 evaluates the evaluation data based on the evaluation values made To correspond to the constituent elements (step S314: evaluation data evaluation module) and generates grading information (ranking) on the plurality of evaluation data. The higher the evaluation data, the higher a relevance to a prescribed matter becomes. With respect to the above learning phase, processing after step S308 corresponds to an evaluation phase. Note that the respective processing included in the above flowchart is just an example and does not indicate a limited mode. Further, for example, one or both of the learning phase and the evaluation phase may be performed in another system different from the present system, and the present system may use a result of the other system.

Extraction and Output of Reason Data

A conventional data analysis system recommends a product but does not provide a satisfactory decision element to decide whether there is a need to buy the product because a reason for recommending the product is not presented or the product is tied to own or other users' purchase history. This is because it is technically difficult to specify a decision element affected by individual's preferences. In this regard, according to the data analysis system 1 of the embodiment, it is possible to extract first information (for example, first reason data) from a plurality of evaluation data based on results of the evaluation (for example, a rank or a score of each sentence data that will be described later) of the plurality of evaluation data, extract second information (for example, second reason data) from one or a plurality of training data based on a characteristic pattern (for example, a data pattern that will be described later) included in the first information, and quickly and properly generate information (for example, reason data indicating a reason for providing information) on a user's tendency (buying a prescribed product, using prescribed service, personnel evaluation, or the like) from the first information and the second information. Further, for the output of information on a user's tendency, it is important to indicate which elements of evaluation data are based and indicate which elements of training data are related to substantially affect the user's tendency.

Figure 5:
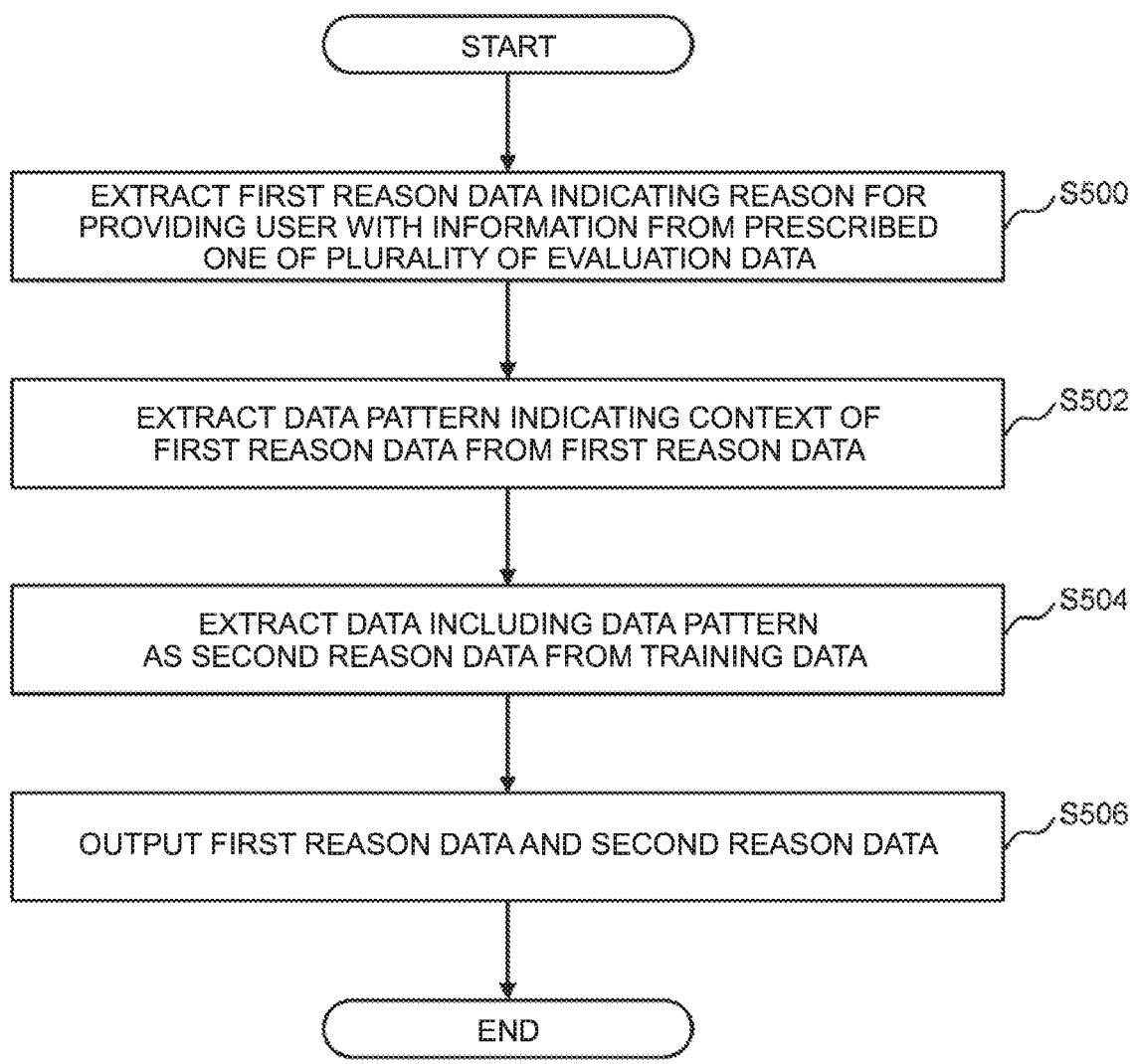
FIG. 5 is a diagram showing an example of a flowchart performed by the server apparatus to extract and output reason data.

FIG. 5 is a flowchart for realizing the data analysis system 1. The server apparatus 2 (specifically, the controller of the server apparatus 2) may perform the flowchart in succession to the above step S314 according to a reason data processing program. The flowchart will be described in detail below. Note that "information provision" in the embodiment indicates the provision of any information but is not limited to the provision of particular information. For example, the information provision may be the recommendation of a product to the user. Further, for example, the information provision may be giving advice on personnel evaluation. Further, for example, the information provision may be calling attention about a response to a complaint. Further, in the embodiment, reason data indicating a reason for the information provision will be exemplified as an example. However, besides a reason for the information provision, data indicating a ground, proof, origin, evidence, theory, reason, circumstance, or the like for the information provision may widely be applied.

As shown in FIG. 5, the data analysis system 1 extracts first reason data indicating a reason for providing the user with information from prescribed data among a plurality of evaluation data (S500).

For example, the server apparatus 2 may select evaluation data having relatively high evaluation (for example, the top 10 evaluation data in a ranking) among a plurality of evaluation data, subject the selected evaluation data to natural language processing to extract sentences (sentence data), calculate a score for each of the sentences (for example, add evaluation values of the constituent elements of the sentence data together), and extract any sentence data having a relatively high score among the scores of the extracted sentence data as the first reason data or extract sentence data having the highest score as the first reason data.

Further, for example, the server apparatus 2 may subject evaluation data having the highest evaluation among the plurality of evaluation data to the natural language processing to extract sentence data, calculate a score for each of the sentence data (for example, add evaluation values of the constituent elements of the sentence data together and extract sentence data having the highest score as the first reason data.

Further, for example, the server apparatus 2 may subject the respective evaluation data to the natural language processing to extract sentence data, calculate a score for each of the sentence data (for example, add evaluation values of the constituent elements of the sentence data together), and extract any sentence data having a relatively high score among the scores of the extracted sentence data as the first reason data or extract sentence data having the highest score among all the evaluation data as the first reason data.

That is, the server apparatus 2 may select, from among the plurality of evaluation data, evaluation data having relatively high evaluation among the plurality of evaluation data, and extract a specific part (for example, sentence data) based on a ratio (for example, a score) of contribution to the evaluation of the evaluation data from a plurality of parts (for example, a plurality of sentence data) constituting the evaluation data and use the specific part as the first information. Otherwise, the server apparatus 2 may select evaluation data having the highest evaluation from among the plurality of evaluation data, and extract, as a specific part, a part having the largest ratio of contribution to the evaluation of the evaluation data and use the specific part as the first information. Otherwise, the server apparatus 2 may evaluate each of a plurality of parts constituting each of the plurality of evaluation data (for example, calculate a score for each of sentence data) based on training data, and set the first information based on results of the evaluation.

A data pattern indicating the context of the first reason data is extracted from the first reason data (S502).

As an example of extracting the data pattern indicating the context of the first reason data from the first reason data, the server apparatus 2 may use a distribution mode in the first reason data (Japanese Patent Application No. 2015-238978). Matters described in the specification and the drawings of Japanese Patent Application No. 2015-238978 are cited in the present application. Note that the mode of the data pattern is not limited to a specific one. The data pattern indicates a relationship with the first reason data in a broad sense. Further, the data pattern may be, as will be described later, a plurality of morphemes by which it becomes to identify a group having a prescribed relationship.

Figures 3, 4:
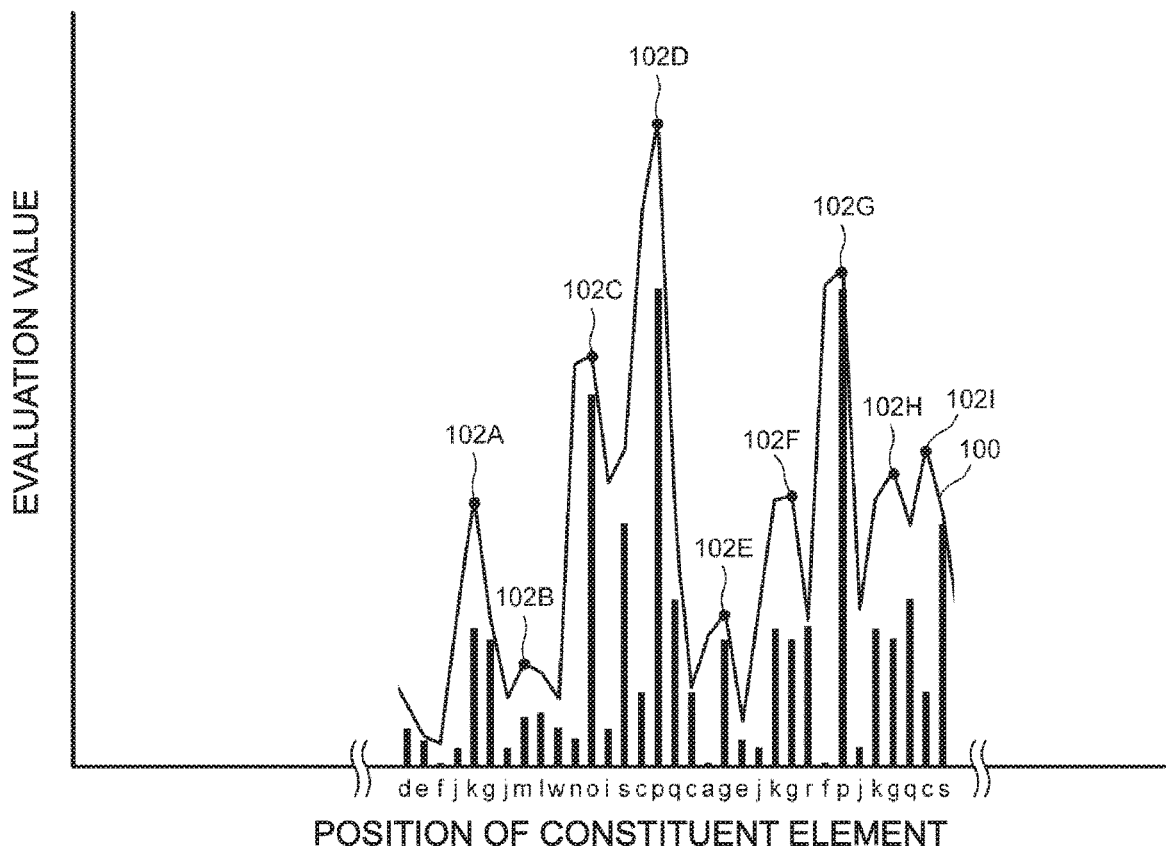
FIG. 3 is a diagram describing the arrangement of constituent elements in first reason data.
FIG. 4 is a characteristic diagram showing the distribution of the evaluation values of a plurality of constituent elements and the occurrence positions of the plurality of constituent elements in training data.

FIG. 3 shows an example of the first reason data. In FIG. 3, each of alphabets a, b, c, and the like corresponds to a morpheme, and "•" indicates an expression such as postpositional word and an adverb not extracted as a morpheme. FIG. 4 shows the distribution of the evaluation values of a plurality of morphemes and the occurrence positions of the plurality of morphemes in the first reason data. A vertical axis indicates the evaluation values of the morphemes, and a horizontal axis indicates the occurrence positions of the morphemes in the first reason data. Respective bars in a bar graph indicate the evaluation values of the morphemes. When the evaluation values of the plurality of morphemes are subjected to smoothening processing by, for example, a Gaussian filter, a characteristic indicated by symbol 100 is obtained.

According to the characteristic 100, the superiority or inferiority (for example, levels of the evaluation values) of the morphemes included in the first reason data may be made visible, which is advantageous in the extraction, fixing, or determination of a data pattern with the server apparatus 2. Morphemes positioned at peaks (102A to 102I) are elements (for example, elements having a high relevance to a prescribed matter) characterizing the combination of data and classifying information. At this time, other morphemes having a prescribed positional relationship with the morphemes positioned at the peaks, for example, morphemes positioned near (for example, adjacent to) the morphemes positioned at the peaks are influenced by constituent elements (specific constituent elements) positioned at the peaks. In other words, such morphemes are caused to have meanings or significance relevant to the morphemes positioned at the peaks and have a high relevance to the prescribed matter.

Therefore, the server apparatus 2 selects morphemes about the peaks of the evaluation values in the distribution of the morphemes and the evaluation values in the first reason data. For example, the server apparatus 2 selects the morphemes corresponding to the peaks and morphemes occurring before and after the morphemes as "morpheme groups." Here, the morpheme groups are, for example, groups obtained by integrating together a plurality of morphemes occurring adjacent to each other in the first reason data. In FIG. 3, regions surrounded by [ ] indicate the morpheme groups. For example, when a, b, and c occur in the order of "a••b••c" and the peak of an evaluation value is set at b in the first reason data, a morpheme group may be defined by "a, b, c." An expression ("•" described above) having no meaning between the morphemes may not be taken into consideration in the morpheme group.

Then, the server apparatus 2 determines one of the selected plurality of morpheme groups as a data pattern. For example, the server apparatus 2 may determine a morpheme group including a morpheme having the highest peak as the data pattern. Further, for example, the server apparatus 2 may determine a morpheme group having the highest average of the evaluation values of the plurality of morphemes constituting the morpheme groups as the data pattern. Further, for example, the server apparatus 2 may perform a definite integral about the characteristic 100 on the respective morpheme groups in the interval between morphemes at both ends of a morpheme group and determine a morpheme group having the largest integral value among the integral values of all the morpheme groups as the data pattern.

Data (a group having a prescribed relationship) including the data pattern is extracted from training data as second reason data (S504).

Here, the data pattern includes the plurality of morphemes indicating the context of the first reason data. Therefore, the extraction of the data including the data pattern is equivalent to the extraction of the second reason data having a context close to the context of the first reason data.

Hereinafter, the processing will be specifically described. When the data pattern extracted from the first reason data is ($M_1$, $M_0$, $M_2$), $M_0$ indicates a peak morpheme and $M_1$ and $M_2$ other than $M_0$ indicate morphemes adjacent to $M_0$.

The server apparatus 2 extracts morphemes from respective training data like the first reason data shown in FIG. 3 and determines whether a morpheme group matching the data pattern ($M_1$, $M_0$, $M_2$) exists. When determining that the matching morpheme group exists, the server apparatus 2 extracts a sentence (sentence data) including the morpheme group as the second reason data. Note that the server apparatus 2 may eliminate training data to which classifying information indicating a relevance to a user's tendency has not been added (training data that has not been evaluated by the user) among the training data from a processing target in step S504.

Here, a plurality of the second reason data may be extracted. In this case, one of the plurality of second reason data may be narrowed down. As a method for narrowing down one of the plurality of second reason data, it may be possible to assume a new data pattern ($M_3$, $M_1$, $M_0$, $M_2$, $M_4$) further including morphemes $M_3$ and $M_4$ adjacent to the morphemes $M_1$ and $M_2$ adjacent to the peak morpheme $M_0$ and determine whether a morpheme group matching the new data pattern exists. Further, for example, it may be possible to assume a new data pattern ($M_3$, $M_1$, $M_0$, $M_2$) including a morpheme (for example, $M_3$) having a higher evaluation value among the morphemes $M_3$ and $M_4$ adjacent to the morphemes $M_1$ and $M_2$ adjacent to the peak morpheme $M_0$ and determine whether a morpheme group matching the new data pattern exists. As described above, an original data pattern is narrowed down using a new data pattern that may be limited based on the first reason data, whereby it becomes possible to extract the second reason data having a context closer to the context of the first reason data.

Further, when the second reason data is not extracted, the data pattern may be changed. For example, it may be possible to assume a new data pattern ($M_1$, $M_0$) in which a morpheme (for example, $M_2$) having a smaller evaluation value among the morphemes $M_1$ and $M_2$ adjacent to the peak morpheme $M_0$ is eliminated and determine whether a morpheme group matching the new data pattern exists. Further, for example, it may be possible to assume a new data pattern ($M_3$, $M_1$, $M_0$) in which the morpheme $M_3$ adjacent to a larger morpheme (for example, $M_1$) is added instead of a morpheme (for example, $M_2$) having a smaller evaluation value among the morphemes $M_1$ and $M_2$ adjacent to the peak morpheme $M_0$ and determine whether a morpheme group matching the new data pattern exists. As described above, even if the second reason data is not extracted from an original data pattern, a new data pattern constituting a part of the original data pattern or adjacent to the original data pattern, i.e., a new data pattern that could be obtained by expanding the original data pattern based on the first reason data is selected, whereby it becomes possible to extract the second reason data.

The first reason data and the second reason data are output (S506).

The server apparatus 2 causes output apparatuses (the client apparatuses 3, equipment connected to the client apparatuses 3, or the like) to output the first reason data and the second reason data.

The "output" represents any mode perceivable by person's five senses (the sense of vision, the sense of hearing, the sense of touch, the sense of taste, and the sense of smell). For example, the data may be displayed on displays connected to the client apparatuses 3. Further, for example, the data may be projected by projection apparatuses connected to the client apparatuses 3. Further, for example, the data may be output as sound, audio, or the like from speakers connected to the client apparatuses 3. Further, for example, the data may be printed or printed in the form of braille by printing apparatuses connected to the client apparatuses 3.

An example of the output mode will be described with reference to FIG. 6. The server apparatus 2 reads a stipulated format (in this example, I recommend this because of the "second reason data", in particular, the "first reason data.") from the storage system 5, apply the first reason data and the second reason data to the format to generate reason data (a reason sentence), generates a screen 600 including a recommended product "wine A" and the reason sentence, and causes the displays of the client apparatuses 3 to display the screen 600.

Here, the reason sentence is generated in various modes. That is, the first reason data and the second reason data may be combined, connected, processed, or fused together. For example, the first reason data and the second reason data may be applied to a format to generate the reason sentence as described above. Further, for example, the first reason data and the second reason data may be itemized to generate the reason sentence. Further, for example, the reason sentence in which the second reason data is first presented and then the first reason data is presented instead of the second reason data may be generated. Further, for example, the reason sentence in which modifiers are eliminated by the natural language processing to simplify the first reason data and the second reason data may be generated when the sentence is long.

Moreover, for example, in view of the importance of evaluation by the present system, the first reason data extracted from evaluation data may be made superior to the second reason data to generate the reason sentence. In this case, the first reason data is recognized as primary reason information for recommending a product, and the second reason data is recognized as secondary reason information for recommending the product. Further, for example, in view of the importance of learning in which the user is involved, the second reason data extracted from training data may be made superior to the first reason data to generate the reason sentence. In this case, the second reason data is recognized as the primary reason information for recommending a product, and the first reason data is recognized as the secondary reason information for recommending the product. Here, the superiority between the first reason and the second reason may refer to a state in which one of the first reason and the second reason is superior in order, size, time, position, range, or the like of its output to the other thereof.

According to the above system, the first reason data and the second reason data are displayed, whereby the user is allowed to grasp which part of an actual review comment constitutes a recommendation ground from the first reason data and further grasp what type of input content (learning content) constitutes the recommendation ground from the second reason data. As described above, the user is allowed to grasp that a product matching his/her preferences is recommended and understand the recommendation of the product. Therefore, it is possible to support user's buying based on the recommendation of the product. Further, for example, when determining that a recommendation reason is not suited to him/her after seeing at least one of the first reason data and the second reason data, the user may change (adjust) training data (an input content) to be able to receive recommendation more suited to him/her. Further, in the system, it is important that the display of the first reason data and the second reason data are displayed as a sentence (a meaningful group) indicating reasons. Thus, the user is allowed to easily and accurately grasp that a product matching his/her preferences is recommended.

The above embodiment is described using a sentence (sentence data) as an example. However, the present invention may widely be applied to groups (block data) having a prescribed relationship in terms of meaning, spirit, gist, concept, significance, main point and the like such as sentences (sentence data), paragraphs (paragraph data), and text (text data).

Data Format Processed by Data Analysis System

In the embodiment, "data" may be any data expressed in such a format as to be made processable by a computer. The data may be, for example, unstructured data having an imperfect structural definition in at least its part, and widely includes (but not limited to) document data including text described by natural language in at least its part (for example, an electronic mail (including an attached file and header information), a technical document (widely including, for example, a document describing a technical matter such as a scientific paper, a patent gazette, a product specification, and a design drawing), a presentation material, a spread sheet material, a financial statement, a meeting material, a report, a business material, a contract, an organization chart, a business plan document, a company analysis information, a care card, a web page, a blog, or a comment posted to social network service), audio data (for example, data in which conversation, music, or the like is recorded), image data (for example, data constituted by a plurality of pixels or vector information), video data (for example, data constituted by a plurality of frame images), or the like.

For example, when analyzing document data, the system may extract morphemes included in the document data serving as training data as constituent elements, evaluate each of the constituent elements, and evaluate the relevance between the document data and a prescribed matter based on constituent elements extracted from document data serving as evaluation data. Further, when analyzing audio data, the system may use the audio data itself as an analysis target or may convert the audio data into document data through audio recognition and use the converted document data as an analysis target. In the former case, for example, the system may divide audio data into partial audio having a prescribed length as constituent elements and discriminate the partial audio using any audio analysis method (for example, a Hidden Markov Model or a Kalman filter) to analyze the audio data. In the latter case, the system may recognize audio using any audio recognition algorithm (for example, a recognition method using a Hidden Markov Model) and analyze recognized data (document data) in the same procedure as the above. Further, when analyzing image data, the system may, for example, divide the image data into partial images having a prescribed size as constituent elements and discriminate the partial images using any image recognition method (for example, pattern matching, a support vector machine, or a neural network) to analyze the image data. Moreover, when analyzing video data, the above system may, for example, divide a plurality of frame images included in the video data into partial images having a prescribed size as constituent elements and discriminate the partial images using any image recognition method (for example, pattern matching, a support vector machine, or a neural network) to analyze the video data.

Realizing Example by Software and Hardware

The control block of the system may be realized by a logical circuit (hardware) formed in an integrated circuit (an IC chip) or the like, or may be realized by software using a CPU. In the latter case, the system has a CPU that performs a program (the control program of the data analysis system) serving as software that realizes respective functions, a read only memory (ROM) or a storage device (called a "recording medium," which may be a transitory recording medium or a non-transitory recording medium) on which the program and various data are recorded so as to be readable by a computer (or the CPU), a random, access memory (RAM) that develops the program, or the like. The object of the present invention is achieved when the computer (or the CPU) reads and performs the program from the recording medium. As the recording medium, a "non-transitory physical medium," for example, a tape, a disk, a card, a semi-conductor memory, or a programmable logical circuit may be used. Further, the program may be supplied to the computer via any transmission medium (such as a communication network and broadcasting waves) capable of transmitting the program. The present invention may be realized even in the form of a data signal embedded in a carrier wave, the data signal being embodied by the electronic transmission of the program. Note that the program may be installed by any programming language. Further, any recording medium on which the program is recorded also falls within the category of the present invention.

APPLICATION EXAMPLE

The system may be realized as, for example, an artificial intelligence system (any system capable of evaluating the relevance between data and a prescribed matter) that analyzes big data such as a discovery support system, a forensic system, an electronic mail monitoring system, a medical application system (for example, a pharmacovigilance support system, a clinical trial expediting system, a medical risk hedge system, a toppling prediction (toppling prevention) system, a prognosis prediction system, or a diagnosis support system), an Internet application system (for example, a smart mail system, an information aggregation (curation) system, a user monitoring system, or a social media management system), an information leakage detection system, a project evaluation system, a marketing support system, an intellectual property evaluation system, an illegal trade monitoring system, a call center escalation system, and a credit investigation system. Note that depending on a field to which the data analysis system according to the present invention is applied, data may be, for example, subjected to preprocessing (for example, an important part may be extracted from the data to be used as a data analysis target) or a mode in which a result of a data analysis is displayed may be changed in consideration of circumstances peculiar to the field. A person skilled in the art could understand the probability of the existence of a variety of such modified examples, and all the modified examples fall within the category of the present invention.

The present invention is not limited to the above respective embodiments but may be modified in various ways within the scope of the claims. Even embodiments obtained by appropriately combining together technical means disclosed in the different embodiments also fall within the technical scope of the present invention. Moreover, new technical features may be formed by combining together the technical means disclosed in the respective embodiments.

What is claimed is:

1. A data analysis system that analyzes data to generate information on a tendency of a user, the data analysis system comprising:
    a memory that stores at least temporarily a plurality of evaluation data to be analyzed; and
    a controller that evaluates each of the plurality of evaluation data based on training data and generates grading information of the plurality of evaluation data,
        wherein after the controller generates the grading information of the plurality of evaluation data, the controller further:
        extracts a part of the plurality of evaluation data as first information from the plurality of evaluation data based on the grading information of the plurality of evaluation data, wherein the plurality of evaluation data have not been classified by the user as related data,
        extracts a characteristic pattern from the first information,
        extracts a part of the training data, which includes the characteristic pattern included in the first information, as second information from the training data, wherein the training data have been classified by the user as the related data, and
        generates a reason sentence by applying the first information and the second information to a format, and
        displays the reason sentence with a recommended product or service.

2. The data analysis system according to claim 1, wherein the controller causes the user to refer to a plurality of reference data and set classifying information for each of the plurality of reference data,
    uses combinations of the reference data and the classifying information as the training data,
    extracts, from the training data, a plurality of constituent elements, each of which constitutes at least a part of the training data,
    sets evaluation information for each of the plurality of constituent elements based on a degree to which each of the plurality of constituent elements contributes to a corresponding one of the combinations, and
    evaluates each of the plurality of evaluation data based on the set evaluation information.

3. The data analysis system according to claim 1, wherein the controller selects, from among the plurality of evaluation data, evaluation data of which results have more than a predetermined value among the plurality of evaluation data, and
    extracts a specific part based on a ratio of contribution to the high evaluation from a plurality of parts constituting the selected evaluation data, and uses the specific part as the first information.

4. The data analysis system according to claim 3, wherein the controller selects evaluation data having highest evaluation from among the plurality of evaluation data, and
    uses, as the specific part, a part having a largest ratio of contribution to the highest evaluation among a plurality of parts constituting the selected evaluation data.

5. The data analysis system according to claim 1, wherein the controller evaluates each of a plurality of parts constituting each of the plurality of evaluation data based on the training data, and
    uses a part of which results have more than a predetermined value among the evaluated parts, as the first information.

6. The data analysis system according to claim 5, wherein the controller uses a part having highest evaluation among the evaluated parts, as the first information.

7. The data analysis system according to claim 1, wherein the controller extracts a plurality of constituent elements from the first information, and
    discriminates the characteristic pattern based on a mode in which the extracted plurality of constituent elements is distributed in the first information.

8. The data analysis system according to claim 1, wherein the tendency of the user is a tendency to buy a prescribed product or service, and
    the controller uses a review comment on the prescribed product or service as the training data,
    wherein the first information and the second information being the primary reason information and the secondary reason information for the recommended product or service, respectively.

9. The data analysis system of claim 1, wherein the generating the reason sentence comprises processing the first information and the second information to delete modifiers from the first information and the second information and generating the reason sentence based on the processed first and second information.

10. The data analysis system of claim 1, wherein the controller generates the reason sentence further by prioritizing the first information and the second information and determining an order of the first information and the second information presented in the reason sentence.

11. A method for controlling a data analysis system that analyzes data to generate information on a tendency of a user, the method causing the data analysis system to:
    evaluate each of a plurality of evaluation data based on training data;
    generate grading information of the plurality of evaluation data;
    extract a part of the plurality of evaluation data as first information from a plurality of evaluation data based on the grading information of the plurality of evaluation data, wherein the plurality of evaluation data have not been classified by the user as related data;
    extract a characteristic pattern from the first information;
    extract a part of the training data, which includes the characteristic pattern included in the first information, as second information from training data wherein the training data have been classified by the user as the related data,
    generate a reason sentence by applying the first information and the second information to a format, and
    display the reason sentence with a recommended product or service.

12. A non-transitory computer-readable medium containing program instructions for causing a computer to perform the method of claim 11.

\* \* \* \* \*